United States Patent [19]

Kania et al.

[11] Patent Number: 5,098,974
[45] Date of Patent: Mar. 24, 1992

[54] ACRYLIC POLYMERS

[75] Inventors: Charles M. Kania, Natrona Heights; Gregory J. McCollum, Gibsonia; Masayuki Nakajima, Allison Park, all of Pa.

[73] Assignee: PPG Industries, Inc., Pittsburgh, Pa.

[21] Appl. No.: 428,526

[22] Filed: Oct. 30, 1989

Related U.S. Application Data

[62] Division of Ser. No. 187,788, May 2, 1988, Pat. No. 4,910,249.

[51] Int. Cl.$^5$ .............................................. C08F 12/28
[52] U.S. Cl. ..................................................... 526/310
[58] Field of Search ........................................ 526/310

[56] References Cited

U.S. PATENT DOCUMENTS

| | | | |
|---|---|---|---|
| 3,940,353 | 2/1976 | Martorano | 523/514 |
| 4,018,826 | 4/1977 | Gless, Jr. et al. | 526/310 |
| 4,021,396 | 5/1977 | Wu | 526/312 |
| 4,238,579 | 12/1980 | Leonard, Jr. et al. | 526/310 |
| 4,255,548 | 3/1981 | Wingard, Jr. et al. | 526/310 |
| 4,302,560 | 11/1981 | Becher et al. | 524/35 |
| 4,556,702 | 12/1985 | Schaefer | 526/310 |
| 4,659,796 | 4/1987 | Horie et al. | 526/310 |
| 4,713,236 | 12/1987 | Hoover et al. | 526/310 |
| 4,754,011 | 6/1988 | Dexter et al. | 526/310 |

FOREIGN PATENT DOCUMENTS 2029429  3/1980  United Kingdom ................ 526/310

Primary Examiner—Joseph L. Schofer
Assistant Examiner—N. Sarofim
Attorney, Agent, or Firm—Daniel J. Long; Bruce H. Cottrell

[57] ABSTRACT

An acrylic copolymer reaction product of a primary amine group-containing copolymerizable vinyl monomer and an ethylenically unsaturated copolymerizable monomer is disclosed. Further, pigment dispersions, including the copolymer reaction product, pigment, and a liquid carrier, are disclosed.

8 Claims, No Drawings

ACRYLIC POLYMERS

This is a division of application Ser. No. 187,788, filed May 2, 1988, now U.S. Pat. No. 4,910,249.

FIELD OF THE INVENTION

The present invention relates to novel acrylic copolymers and to pigment dispersion compositions including such copolymers.

BACKGROUND OF THE INVENTION

Pigmented coating compositions are useful for their aesthetic as well as protective feature. Such compositions contain a film-forming resin and a pigment dispersed in a liquid carrier. It is important that the pigment be satisfactorily dispersed throughout any film which results from the application of the coating composition. Therefore, it is desirable that the pigment be well dispersed throughout the liquid coating composition. Typically, the pigment in a coating composition is first dispersed with a polymeric resin referred to as a pigment grind vehicle or pigment dispersant. The resulting dispersion is then mixed with the film-forming resin of the coating composition and any other necessary components to produce the coating composition.

The use of amine functionality in pigment grind vehicles is well known. For example, U.S. Pat. No. 3,940,353 describes incorporation of small amounts of unsaturated amine group-containing monomers into polymer solutions to give improved pigment dispersants. Similarly, U.S. Pat. No. 4,302,560 describes incorporation of amine or amine salt functionality into a pigment dispersant. One common manner of incorporating amine functionality into an acrylic pigment dispersant has been to react a nitrogen-containing compound, such as an aziridine, with some of the carboxylic acid groups of an acrylic polymer. For example, aziridine compounds, such as ethyleneimine or propyleneimine, can be reacted to provide the amine functionality. However, the toxicity of ethyleneimine and propyleneimine has made this route undesirable. Consequently, an acrylic grind vehicle having amine functionality provided by means other than imine chemistry has been sought.

SUMMARY OF THE INVENTION

The present invention provides an acrylic polymer having pendent tertiary alkyl primary amine groups and at least one other pendent functionality reactive with isocyanate groups. The pendent functionality reactive with isocyanate groups can be, e.g., carboxylic acid groups, hydroxyl groups or mixtures thereof.

The present invention further provides primary amine group-containing acrylic polymers prepared by free radical polymerization of a reaction mixture including a primary amine group-containing copolymerizable vinyl monomer and at least one copolymerizable ethylenically unsaturated monomer characterized as free of primary amine groups. In one embodiment, at least one copolymerizable ethylenically unsaturated monomer free of primary amine groups in the reaction mixture is further characterized as containing a functional group reactive with an isocyanate group. The primary amine group-containing copolymerizable vinyl monomer can be of the formula:

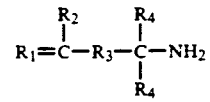

wherein $R_1$ is an alkylidene group having from 1 to 3 carbon atoms; $R_2$ is a hydrogen or an alkyl radical having from 1 to 3 carbon atoms, $R_3$ represents an aromatic hydrocarbon moiety; and $R_4$ is an alkyl radical having from 1 to 3 carbon atoms. In preferred embodiments, the primary amine group-containing copolymerizable vinyl monomer is meta-isopropenyl-alpha,alpha-dimethylbenzyl amine or para-isopropenyl-alpha,alpha-dimethylbenzyl amine.

The present invention still further provides a pigment dispersion composition comprising from about 1 to about 50 percent by weight of an acrylic polymer as a dispersant, the acrylic polymer having pendent tertiary alkyl primary amine groups, from about 10 to about 90 percent by weight of a pigment, and the balance a liquid carrier. The dispersant, i.e., the acrylic polymer can be formed by vinyl polymerization of a reaction mixture including a primary amine group-containing copolymerizable vinyl monomer of the formula A as described above, and at least one copolymerizable ethylenically unsaturated monomer.

DETAILED DESCRIPTION

The invention herein described concerns: (1) novel acrylic polymers having pendent tertiary alkyl primary amine groups and at least one other pendent functionality reactive with isocyanate groups, such polymers useful as, e.g., pigment grinding vehicles, i.e., pigment dispersant polymers, (2) primary amine group-containing acrylic polymers prepared by free-radical polymerization of a reaction mixture including a primary amine group-containing copolymerizable vinyl monomer and at least one copolymerizable ethylenically unsaturated monomer characterized as free of primary amine groups, and (3) pigment dispersion compositions including an acrylic dispersant polymer having pendent tertiary alkyl primary amine groups, pigment, and a liquid carrier.

The acrylic polymers having pendent tertiary alkyl primary amine groups and at least one other pendent functionality reactive with isocyanate groups are copolymers of a primary amine group-containing copolymerizable vinyl monomer and at least one ethylenically unsaturated monomer containing functional groups such as, e.g., carboxylic acid or hydroxyl groups, such groups being reactive with isocyanate groups. Consequently, the resultant polymer includes, e.g., carboxylic acid groups, hydroxyl groups or mixtures thereof.

The primary amine group-containing copolymerizable vinyl monomer used in the vinyl polymerization processes described herein can be a tertiary alkyl primary amine. Exemplary of such a tertiary alkyl primary amine are monomers of the formula:

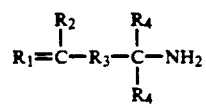

wherein $R_1$ is an alkylidene group having from 1 to 3 carbon atoms; $R_2$ is a hydrogen or an alkyl radical having from 1 to 3 carbon atoms, $R_3$ represents an aromatic hydrocarbon moiety, e.g., a moiety such as phenylene, biphenylene or naphthylene; and $R_4$ is an alkyl radical having from 1 to 3 carbon atoms. Preferred among the primary amine group-containing monomers are meta-isopropenyl-alpha,alpha-dimethylbenzyl amine and para-isopropenyl-alpha,alpha-dimethylbenzyl amine. The meta isomer is the most preferred primary amine group-containing monomer.

The tertiary alkyl primary amines used as primary amine group-containing copolymerizable vinyl monomers in the present invention can be derived from tertiary alkyl isocyanates. For example, a tertiary alkyl isocyanate such as meta-isopropenyl-alpha,alpha-dimethylbenzyl isocyanate can be reacted with a tertiary alcohol such as diacetone alcohol (4-hydroxy-4-methyl-2-pentanone) in the presence of a catalyst. Exemplary catalysts include dibutyltin diacetate, dibutyltin dilaurate, dibutyltin oxide, dimethylbenzyl amine and the like or mixtures thereof. A mixture of dibutyltin dilaurate and dimethylbenzyl amine can provide greater yield and may be preferred. Reaction of the isocyanate and the tertiary alcohol provides a urethane. This urethane product can be decomposed by subsequent heating to eliminate carbon dioxide and yield the corresponding tertiary alkyl primary amine, a primary amine group-containing copolymerizable monomer. Similar reactants can be prepared from tertiary alkyl isocyanates of the formula:

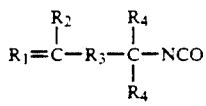

(B)

wherein $R_1$ is an alkylidene group having from 1 to 3 carbon atoms; $R_2$ is a hydrogen or an alkyl radical having from 1 to 3 carbon atoms; $R_3$ represents an aromatic hydrocarbon moiety, e.g., a moiety such as phenylene, biphenylene, or naphthylene; and $R_4$ is an alkyl radical having from 1 to 3 carbon atoms. Other alcohols may be used, preferably the alcohol having substituents beta to the hydroxyl to activate dehydration. Such alcohols may include, e.g., ethyl-3-hydroxybuterate and the like.

The primary amine group-containing copolymerizable vinyl monomers can also be derived from a tertiary alkyl isocyanate such as meta-isopropenyl-alpha,alpha-dimethylbenzyl isocyanate by reaction with an alkanolamine containing either primary or secondary amine functionality to form a urea reaction product, followed by heating the urea reaction product at temperatures and for time sufficient to decompose the urea reaction product and form the tertiary alkyl primary amine. The alkanolamine preferably has two carbon atoms between the amino and hydroxyl functionality. The process of preparing tertiary alkyl primary amines is more fully described and claimed in co-pending U.S. application Ser. No. 07/187,786, entitled PREPARATION OF ALKYL PRIMARY AMINES, by Kahle et al, filed on the same date herewith, and such description is incorporated herein by reference. The primary amine group-containing copolymerizable vinyl monomer is preferably prepared via the alkanolamine/urea process wherein greater yields are obtainable than via the alcohol/urethane process.

An important aspect of the presently described novel acrylic polymers is that they can be prepared by the direct free radical copolymerization of a primary amine group-containing vinyl monomer, e.g., a tertiary alkyl primary amine such as meta-isopropenyl-alpha,alpha-dimethylbenzyl amine, and one or more copolymerizable ethylenically unsaturated monomers, at least one of such ethylenically unsaturated monomers including functional groups reactive with an isocyanate group. For example, the polymers can be formed from reaction mixtures including an ethylenically unsaturated carboxylic acid, such as acrylic acid, methacrylic acid, crotonic acid, or mixtures thereof and a primary amine group-containing vinyl monomer. Acrylic acid and methacrylic acid are preferred ethylenically unsaturated carboxylic acids for such a reaction.

Similarly, the polymers can be formed from a reaction mixture containing such a primary amine group-containing monomer and a hydroxyl-containing copolymerizable ethylenically unsaturated monomer. Such a hydroxyl-containing monomer can be, e.g., an acrylic monomer such as 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate and the like. Optionally, a monomer which provides at least one hydroxyl group when reacted with an acid may be included as the hydroxyl-containing monomer. For example, glycidyl methacrylate or glycidyl acrylate may be reacted with an acid such as acetic acid, lauric acid and the like to open the epoxide ring and generate a hydroxyl group and thereafter reacted with the primary amine group-containing monomer to form the polymerization product.

Reaction mixtures for forming the acrylic polymers can further include an ethylenically unsaturated monomer free of functional groups reactive with an isocyanate group, e.g., esters of an ethylenically unsaturated carboxylic acid such as an alkyl methacrylate having from 1 to about 20 carbon atoms in the alkyl group or an alkyl acrylate having from 1 to about 20 carbon atoms in the alkyl group. Typical alkyl methacrylates and alkyl acrylates that can be used as a copolymerizable ethylenically unsaturated monomer include methyl methacrylate, ethyl methacrylate, propyl methacrylate, isopropyl methacrylate, butyl methacrylate, isobutyl methacrylate, hexyl methacrylate, 2-ethylhexyl methacrylate, nonyl methacrylate, lauryl methacrylate, stearyl methacrylate, cyclohexyl methacrylate, isodecyl methacrylate, isobornyl methacrylate, ethyl acrylate, methyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, isobornyl acrylate and the like.

Another type of vinyl monomer which can be used in preparing the acrylic polymers constitutes copolymerizable monomeric materials containing a vinyl group other than the vinyl monomers mentioned above. Examples of these materials would include vinyl aromatic compounds such as styrene, alpha-methyl sytrene, and alpha-chlorostyrene, and compounds such as acrylonitrile.

In the present description, the term "vinyl aromatic compound" is not meant to include materials such as the primary amine group-containing copolymerizable vinyl monomer wherein, e.g., such a monomer contains an aromatic moiety. That is, "vinyl aromatic compound" does not encompass monomers such as meta or para-isopropenyl-alpha,alpha-dimethylbenzyl amine and the like.

The acrylic polymers can be made by conventional solution polymerization of the aforedescribed individual components in an inert organic solvent. A so-called "one shot" procedure can be used wherein each of the individual monomers is present at the start of the polymerization reaction. The reaction can be conducted at a temperature of from about 80° Centigrade (C) to about 160° C., preferably from about 110° C. to about 145° C. for from about 45 minutes to about 6 hours, preferably from about 90 minutes to about 2½ hours. Examples of suitable inert organic solvents include the following: ether-type alcohols, e.g., ethylene glycol monobutylether, ethylene glycol monoethylether and propylene glycol monobutylether, ethanol, propanol, isopropanol, butanol, isobutanol, toluene, methyl ethyl ketone, methyl amyl ketone, V.M.&P Naphtha and the like. The polymerization is carried out in the presence of a vinyl polymerization catalyst. Preferred catalysts include, e.g., azobis(isobutyronitrile), 2,2'-azobis(2-methylbutyronitrile), 2,2'-azobis(2-methylpropionitrile), tertiary butyl perbenzoate, tertiary butyl pivalate, tertiary butyl acetate, isopropyl percarbonate or benzoyl peroxide. Optionally, chain transfer agents such as alkyl mercaptans, e.g., tertiary dodecyl mercaptan and the like, can also be used. It should be recognized that the resultant reaction product can be isolated or have a part of the solvent removed. Preferably, the solvent is retained for convenience in later forming the pigment dispersion and any coating composition containing the same.

The resultant primary amine group-containing acrylic polymers generally have peak molecular weights from about 500 to about 100,000, preferably from about 1000 to about 60,000 as determined by gel permeation chromatography (GPC) using a polystyrene standard.

In one embodiment, the acrylic polymer having pendent tertiary alkyl primary amine groups and at least one other pendent functionality reactive with isocyanate groups is formed from a reaction mixture including from about 65 to about 99.9 percent by weight of an alkyl acrylate or alkyl methacrylate having from about 1 to about 20 carbon atoms in the alkyl group, from about 0.05 to about 10 percent by weight of the primary amine group-containing copolymerizable vinyl monomer, and from about 0.05 to about 25 percent by weight of an ethylenically unsaturated carboxylic acid. In another embodiment, the acrylic polymer is formed from a reaction mixture including from about 50 to 99.9 percent by weight of an alkyl acrylate or alkyl methacrylate having from about 1 to about 20 carbon atoms in the alkyl group, from about 0.05 to about 10 percent by weight of the primary amine group-containing copolymerizable vinyl monomer, from about 0 to about 40 percent by weight of a vinyl aromatic compound, and from about 0.05 to about 20 percent by weight of a hydroxyl-group containing acrylate.

In still another embodiment, the acrylic polymer is formed from a reaction mixture including from about 50 to about 80 percent by weight of an alkyl methacrylate having from about 1 to about 8 carbon atoms in the alkyl group, from about 10 to about 30 percent by weight of a vinyl aromatic compound, from about 0.05 to about 10 percent by weight of para-or meta-isopropenyl-alpha,alpha-dimethylbenzyl amine, and from about 5 to about 25 percent by weight of either an ethylenically unsaturated carboxylic acid or a hydroxyl group-containing (meth)acrylate or a mixture thereof.

The aforedescribed acrylic polymers are generally useful as pigment dispersant polymers and permit the prior preparation of dispersions of pigments or pigment mixtures which can be subsequently used in coating compositions. Each of the dispersions can be employed for the direct pigmentation of coating compositions. Such pigment dispersions can be prepared at any convenient time and stored for future use.

Further, aforedescribed acrylic polymers may be useful in curable thermosetting acrylic systems wherein, e.g., carboxylic acid or hydroxyl functionality on the acrylic polymer is cured with a melamine resin, an epoxy resin and the like.

In another aspect of the invention, pigment dispersion compositions are provided and comprise from about 1 to about 50 percent by weight of an acrylic polymer having tertiary alkyl primary amine groups, from about 10 percent to about 90 percent by weight of a pigment, and the balance a liquid carrier. Those skilled in the art will recognize that the precise ranges will vary depending on the choice of pigment.

Pigments useful herein include those conventionally used in the coatings industry. Examples of suitable pigments include iron oxides, lead chromates, silicon chromate, strontium chromate, lead carbonate, lead sulfate, barium carbonate, china clay, calcium carbonate, aluminum silica, zinc oxide, zinc sulfide, zirconium oxide, antimony oxide, quinacridones, titanium dioxide, chrome green, chrome yellow, thio-indigo red, phthalo blue, phthalo green, cobalt blue, cadmium yellow, cadmium red, toluidine red, graphite, carbon black, metallic aluminum, metallic zinc, and the like.

The liquid carrier used in the pigment dispersion compositions can be, e.g., a solvent and conveniently can be the solvents used in the reaction of the monomers to form the primary amine group-containing acrylic polymer. However, other solvents, such as xylene or mineral spirits, can be added.

The dispersant polymer can generally be any primary amine group-containing acrylic polymer derived from a primary amine group-containing copolymerizable vinyl monomer and at least one copolymerizable ethylenically unsaturated monomer. For example, the dispersant polymer can be a primary amine group-containing acrylic polymer as previously described wherein the polymer is prepared from a reaction mixture including a primary amine group-containing monomer and at least one ethylenically unsaturated monomer having functional groups reactive with isocyanate groups. The dispersant polymer may also be a primary amine group-containing acrylic polymer prepared from a reaction mixture including a primary amine group-containing copolymerizable vinyl monomer and one or more copolymerizable ethylenically unsaturated monomers free of functional groups reactive with isocyanate groups. U.S. Pat. No. 4,547,265 describes copolymers of primary amine group-containing vinyl monomers, specifically meta- or para-isopropenyl-alpha,alpha-dimethylbenzylamine, and copolymerizable ethylenically unsaturated monomers free of functional groups reactive with isocyanate groups such as styrene, methyl styrene, p-methylstyrene, p-methyl-methylstyrene, ethylene, propylene, isobutylene, 1-butene, 1-pentene, 1-hexene, 1-octene, alkyl acrylates, alkyl methacrylates and halo-substituted ethylenes.

Typically, primary amine group-containing acrylic polymers useful as the dispersant polymer will be formed from reaction mixtures including from about 0.05 to about 10 percent by weight of the primary amine group-containing copolymerizable vinyl monomer and from about 90 to about 99.95 percent by weight of one or more copolymerizable ethylenically unsaturated monomers.

The pigment dispersion compositions can also contain other additives commonly used in pigment dispersion compositions, for example, plasticizers, wetting agents, defoamers, diluents and flow control agents.

Pigments dispersion compositions are made by grinding or dispersing the pigment into the dispersant polymer. The grinding is usually accomplished by the use of ball mills, sand mills, Cowles dissolvers, continuous attritors and the like, until the pigment has been reduced to the desired size. After grinding, the particle size of the pigment is generally in the range of about 10 microns or less.

The pigment dispersion compositions described above are compatible with a wide variety of film-forming resins and do not adversely effect the properties of a dried film made from the coating compositions. In particular, films made from such pigment dispersion compositions have good color development and intercoat adhesion, i.e., have the ability to adhere to a previously formed film.

In another aspect of the invention, coating compositions may be provided which comprise from about 25 percent to about 95 percent, preferably about 30 percent to about 80 percent of a film-forming resin, from about 1 percent to about 70 percent, preferably from about 20 percent to about 60 percent of pigment, from about 1 percent to about 50 percent, preferably from about 2 percent to about 30 percent of a dispersant polymer, and the balance liquid carrier. Suitable film-forming resins used in conjunction with the pigment dispersion compositions can be, for example, thermoplastic-type resins such as acrylic lacquers or thermosetting-type resins such as isocyanate or melamine curable acrylics.

The following examples are illustrative of the invention. Examples 1 and 2 illustrate the preparation of a primary amine group-containing copolymerizable vinyl monomer.

EXAMPLE 1

A reaction vessel was charged with 514.4 grams (g) of meta-isopropenyl-alpha,alpha-dimethylbenzyl isocyanate and heated to 86° C. Addition of 296.8 g of diacetone dialcohol was then completed dropwise over about one hour. The mixture was maintained at about 86° C. for two hours, followed by heating to about 100° C. and addition of 0.18 g dibutyltin dilaurate. The mixture was maintained until the isocyanate groups had disappeared as indicated by infrared (IR).

EXAMPLE 2

The reaction mixture from Example 1 was filtered to remove a urea by-product of the m-isopropenyl-alpha,alpha-dimethylbenzyl isocyanate. The remaining liquid portion (328.5 g) was mixed with 847.7 g of water and stirred under reflux at about 95° C. and the distillate collected. An additional 300 g of water was added as the distillation proceeded and distillation was continued to remove, e.g., excess alcohol, water and mesityl oxide. The remaining mixture was extracted with two portions of toluene (each portion 200 milliliters). During extraction, a precipitate formed at the interphase. The precipitate was removed by filtration. The separated organic layer was dried over anhydrous sodium sulfate. Then, the toluene was evaporated leaving an oil. This crude product was vacuum distilled to yield 72.6 g of m-isopropenyl-alpha,alpha-dimethylbenzyl amine (m-TMA) having a measured amine equivalent weight of about 182.1.

Examples 3, 4 and 5 illustrate the preparation of acrylic polymers containing the pendent tertiary alkyl primary amine groups.

EXAMPLE 3

An acrylic copolymer was formed from the following:

| Ingredient | Parts by Weight |
|---|---|
| Initial Charge | |
| Toluene | 448.5 |
| Feed A | |
| Methyl methacrylate (MMA) | 1029.3 |
| Lauryl methacrylate (LMA) | 115.0 |
| Amine group-containing monomer of Example 2 (m-TMA) | 5.8 |
| Feed B | |
| Toluene | 149.5 |
| Initiator[1] | 5.75 |
| Feed C | |
| Toluene | 576.6 |
| Feed D | |
| Toluene | 320.4 |
| Initiator[1] | 4.37 |
| Feed E | |
| Toluene | 106.8 |
| Feed F | |
| Methyl ethyl ketone | 533.9 |

[1] 2,2'-azobis(2-methylbutyronitrile), available as VAZO 67 from E. I. Dupont de Nemours and Co.

The initial charge was placed into a reaction vessel equipped with heating means, stirring means, addition means, refluxing means, and means for maintaining a nitrogen blanket throughout the reaction, and heated to reflux. At the reflux temperature of about 110° C., Feeds A and B were gradually added over two hours, followed by addition of Feed C. Feed D was then gradually added over three hours, followed by addition of Feed E. After an additional half hour of reflux, heating was discontinued and Feed F was added. The resultant reaction mixture had 35.3 percent solids at 110° C., an acid value of 0.03 and a viscosity of 0.92 stokes. The peak molecular weight of the product as determined by GPC was about 42,500.

EXAMPLE 4

A series of acrylic copolymers were formed in a similar manner to Example 3 with the following compositions:

| | Monomer (percent by weight) | | | |
|---|---|---|---|---|
| Copolymer | MMA | LMA | m-TMA | Methacrylic Acid (MAA) |
| 4A | 89.25 | 10.0 | 0.5 | 0.25 |
| 4B | 89.0 | 10.0 | 0.5 | 0.5 |
| 4C | 88.75 | 10.0 | 0.5 | 0.75 |
| 4D | 88.5 | 10.0 | 0.5 | 1.0 |

EXAMPLE 5

A series of acrylic copolymers were formed in a similar manner to Example 3 with the following compositions:

| Copolymer | Monomer (percent by weight) | | | Methacrylic Acid (MAA) |
|---|---|---|---|---|
| | MMA | LMA | m-TMA | |
| 5A | 89.5 | 10.0 | 0.25 | 0.25 |
| 5B | 89.25 | 10.0 | 0.25 | 0.5 |
| 5C | 89.0 | 10.0 | 0.25 | 0.75 |

EXAMPLE 6

Preparation of an iminated acrylic copolymer for comparison was as follows:

| Ingredient | Parts by Weight |
|---|---|
| Initial Charge | |
| Toluene | 448.5 |
| Feed 1 | |
| Methyl methacrylate | 1029.3 |
| Lauryl methacrylate | 115.0 |
| Methacrylic acid | 5.8 |
| Feed 2 | |
| Toluene | 149.5 |
| Initiator[1] | 11.5 |
| Feed 3 | |
| Toluene | 576.6 |
| Feed 4 | |
| Toluene | 320.4 |
| Initiator | 4.4 |
| Feed 5 | |
| Hydroxyethylethylene imine | 2.96 |
| Feed 6 | |
| Toluene | 106.8 |
| Feed 7 | |
| Methyl ethyl ketone | 533.9 |

The initial charge was placed into a reaction vessel as in example 3 and heated to reflux. At the reflux temperature of about 110° C., Feeds A and B were gradually added over two hours, followed by addition of Feed C. Feed D was then gradually added over three hours, followed by sequential addition of Feeds E and F. After an additional hour of reflux, heating was discontinued and Feed G was added. The resultant reaction mixture had 33.3 percent solids at 110° C., an acid value of 1.0, a viscosity of 0.5 stokes and a peak molecular weight of about 31,940.

Examples 7 and 8 illustrate the use of the acrylic polymers with the pendent tertiary alkyl primary amine groups.

EXAMPLE 7

The acrylic polymers of Examples 4, 5 and, for comparison, 6 were used as dispersants to formulate pigment dispersions having the following compositions:

| | 7A | 7B | 7C | 7D | 7E | 7F | 7G | 7H |
|---|---|---|---|---|---|---|---|---|
| Grinding Vehicle of Example 4A[1] | 27.2 | — | — | — | — | — | — | — |
| Grinding Vehicle of Example 4B[1] | — | 27.2 | — | — | — | — | — | — |
| Grinding Vehicle of Example 4C[1] | — | — | 27.2 | — | — | — | — | — |
| Grinding Vehicle of Example 4D[1] | — | — | — | 27.2 | — | — | — | — |
| Grinding Vehicle of Example 5A[1] | — | — | — | — | 27.2 | — | — | — |
| Grinding Vehicle of Example 5B[1] | — | — | — | — | — | 27.2 | — | — |
| Grinding Vehicle of Example 5C[1] | — | — | — | — | — | — | 27.2 | — |
| Grinding Vehicle of Example 6[1] | — | — | — | — | — | — | — | 27.2 |
| Carbon black | 6.0 | 6.0 | 6.0 | 6.0 | 6.0 | 6.0 | 6.0 | 6.0 |
| Xylene | 10.1 | 10.1 | 10.1 | 10.1 | 10.1 | 10.1 | 10.1 | 10.1 |
| Butanol | 5.1 | 5.1 | 5.1 | 5.1 | 5.1 | 5.1 | 5.1 | 5.1 |
| Methyl ethyl ketone | 1.6 | 1.6 | 1.6 | 1.6 | 1.6 | 1.6 | 1.6 | 1.6 |

[1]An approximately 35 percent by weight resin solids solution in a solvent blend of 75:25 percent by weight of toluene methyl ethyl ketone.

The pigment dispersant formulations of 7A to 7H were each letdown with an acrylic copolymer solution having the following composition: 25.3 percent by weight of a 90/10 percent by weight copolymer of MMA and LMA, 4.0 percent by weight heptyl acetate; 25.7 percent by weight methyl ethyl ketone; 9.1 percent by weight butyl benzyl phthalate; 0.5 percent by weight of a dilute silicone solution; and 35.3 percent by weight of toluene. Each pigment dispersant formulation was entered into a separate jar and 200 g of 3 millimeter steel shot was added. The jars were shaken for 35 minutes. Then, 60 percent of each formulation (30 g) was removed from the jars and individually mixed with 115.08 g of the acrylic letdown, followed by reshaking. Each resultant pigment dispersion and original paste was then drawn down on a glass plate and examined. Examples 7A to 7G all had improved gloss in comparison to example 7H. In addition, Examples 7A to 7G were judged to be better in color strength to Example 7H.

EXAMPLE 8

The dispersants of Examples 4, 5 and 6 were used to formulate pigment dispersions having the following compositions:

| | 8A | 8B | 8C | 8D | 8E | 8F | 8G | 8H |
|---|---|---|---|---|---|---|---|---|
| Grinding Vehicle of Example 4A[1] | 26.31 | — | — | — | — | — | — | — |
| Grinding Vehicle of Example 4B[1] | — | 26.31 | — | — | — | — | — | — |
| Grinding Vehicle of Example 4C[1] | — | — | 26.31 | — | — | — | — | — |
| Grinding Vehicle of Example 4D[1] | — | — | — | 26.31 | — | — | — | — |
| Grinding Vehicle of Example 5A[1] | — | — | — | — | 26.31 | — | — | — |
| Grinding Vehicle of Example 5B[1] | — | — | — | — | — | 26.31 | — | — |
| Grinding Vehicle of Example 5C[1] | — | — | — | — | — | — | 26.31 | — |
| Grinding Vehicle of Example 6[1] | — | — | — | — | — | — | — | 26.31 |
| Toluene | 18.69 | 18.69 | 18.69 | 18.69 | 18.69 | 18.69 | 18.69 | 18.69 |

-continued

|  | 8A | 8B | 8C | 8D | 8E | 8F | 8G | 8H |
|---|---|---|---|---|---|---|---|---|
| Organic pigment[2] | 5.00 | 5.00 | 5.00 | 5.00 | 5.00 | 5.00 | 5.00 | 5.00 |

[1]An approximately 35 percent by weight resin solids solution in a solvent blend of 75:25 percent by weight of toluene methyl ethyl ketone.
[2]Monastral maroon, a quinacridone pigment available from Ciba-Geigy Corporation.

The pigment dispersant formulations of 8A to 8H were each letdown in a manner similar to Example 7 with an acrylic polymer solution having the following compositions: 17.3 percent by weight of a 90/10 percent by weight copolymer of MMA and LMA; 42.9 percent by weight of toluene; and 39.8 percent by weight methyl ethyl ketone. To 30 g of each pigment dispersant formulation 8A to 8H was admixed 42.88 g of the acrylic letdown, followed by reshaking and drawdown on glass panels. Examples 8A to 8G had less haze than example 8H while having equal or better transparency. Examples 8E to 8G had better gloss than 8H.

Examples 9 and 10 illustrate additional acrylic polymers having the pendent tertiary alkyl primary amine groups.

EXAMPLE 9

Acrylic copolymers were formed from the following:

| Ingredient | Parts by Weight A | Parts by Weight B |
|---|---|---|
| Initial Charge | | |
| Methyl amyl ketone | 768.0 | 768.0 |
| Feed 1 | | |
| 2-ethylhexyl acrylate | 758.4 | 748.8 |
| Styrene | 384.0 | 384.0 |
| Butyl Methacrylate | 384.0 | 384.0 |
| Methacrylic acid | 384.0 | 384.0 |
| Amine group-containing monomer of Example 2 (m-TMA) | 9.6 | 19.2 |
| Tertiary dodecyl mercaptan | 38.4 | 38.4 |
| Feed 2 | | |
| Methyl amyl ketone | 448.0 | 448.0 |
| Initiator[1] | 96.0 | 96.0 |
| Feed 3 | | |
| Methyl amyl ketone | 32.0 | 32.0 |
| Initiator[1] | 7.68 | 7.68 |
| Feed 4 | | |
| Methyl amyl ketone | 32.0 | 32.0 |
| Initiator[1] | 7.68 | 7.68 |

[1]As in Example 3.

Each initial charge was placed into a reaction vessel as in Example 3 and heated to reflux. At the reflux temperature of about 50° C., Feeds A and B were gradually added over three hours. Feed C was then gradually added over one hour; followed by the gradual addition of Feed D over one hour. The reaction mixture was then cooled and the resultant product A had 58.9 percent solids at 110° C., an acid value of 61.7, a viscosity of 3.9 stokes and a peak molecular weight of about 3700, as determined by GPC, while resultant product B had 59.1 percent solids at 110° C., an acid value of 62.1, a viscosity of 5.85 stokes and a peak molecular weight of about 4010.

EXAMPLE 10

Acrylic copolymers were formed from the following:

| Ingredient | Parts by Weight A | Parts by Weight B |
|---|---|---|
| Initial Charge | | |
| V.M. & P. Naphtha | 291.8 | 291.8 |
| Isobutanol | 230.4 | 230.4 |
| A portion of feed 1 | 665.6 | 665.6 |
| Feed 1 | | |
| Hydroxyethylacrylate | 166.4 | 166.4 |
| Amine-containing monomer of example 2 (m-TMA) | 8.3 | 8.3 |
| Methacrylic acid | — | 8.3 |
| Styrene | 499.2 | 499.2 |
| 2-ethylhexyl acrylate | 332.8 | 332.8 |
| Butyl methacrylate | 324.5 | 332.8 |
| Methyl methacrylate | 322.8 | 316.2 |
| Tertiary dodecyl mercaptan | 21.6 | 21.6 |
| Initiator[1] | 6.66 | 6.66 |
| Feed 2 | | |
| V.M. & P. Naphtha | 30.7 | 30.7 |
| Feed 3 | | |
| Toluene | 169.0 | 169.0 |
| Initiator[1] | 4.99 | 4.99 |
| Feed 4 | | |
| V.M. & P. Naphtha | 706.6 | 706.6 |
| Isobutanol | 107.5 | 107.5 |

[1]2,2'-azobis(2-methylpropionitrile), available as VAZO-64 from E. I. Dupont de Nemours and Co.

Each initial charge was placed into a reaction vessel as in Example 3 and heated to reflux. At the reflux temperature of about 110° C., the remainder of Feed 1 was gradually added over 1½ hours. Feed 2 was then added as a rinse followed by gradual addition of Feed 3 over three hours. Heating was continued for another half hour, followed by cooling and addition of Feed 4. The resultant product A had 50.3 percent solids at 110° C., an acid value of 0.3, a viscosity of 4.33 stokes and a peak molecular weight of about 18,000, while resultant product B had 50.6 percent solids at 110° C., an acid value of 2.17, a viscosity of 4.37 stokes and a peak molecular weight of about 17,640.

Obviously, many modifications and variations of the present invention are possible in light of the above disclosure. It is, therefore, to be understood that within the scope of the appended claims, the invention may be practiced otherwise than as specifically described.

We claim:

1. A primary amine group-containing acrylic polymer prepared by free-radical polymerization of a reaction mixture comprising a primary amine group-containing copolymerizable vinyl monomer and at least one copolymerizable ethylenically unsaturated monomer characterized as free of primary amine groups wherein at least one copolymerizable ethylenically unsaturated monomer free of primary amine groups is further characterized as having a functional group reactive with an isocyanate group and the primary amine group-containing copolymerizable vinyl monomer is of the formula:

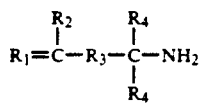

wherein $R_1$ is an alkylidene group having from 1 to 3 carbon atoms; $R_2$ is a hydrogen or an alkyl radical having from 1 to 3 atoms; $R_3$ represents an aromatic hydrocarbon moiety; and $R_4$ is an alkyl radical having from 1 to 3 carbon atoms.

2. The polymer of claim 1 wherein the primary amine group-containing copolymerizable vinyl monomer is a tertiary-alkyl primary amine.

3. The polymer of claim 1 wherein the primary amine group-containing copolymerizable vinyl monomer is m-isopropenyl-alpha,alpha-dimethylbenzyl amine or p-isopropenyl-alpha,alpha-dimethylbenzyl amine.

4. The polymer of claim 1 wherein at least one copolymerizable ethylenically unsaturated monomer free of primary amine groups is selected from the group consisting of ethylenically unsaturated carboxylic acids, hydroxyl-containing alkyl acrylates, or hydroxyl-containing alkyl methacrylates.

5. The polymer of claim 3 wherein at least one copolymerizable ethylenically unsaturated monomer free of primary amine groups is selected from the group consisting of ethylenically unsaturated carboxylic acids, hydroxyl-containing alkyl acrylates, or hydroxyl-containing alkyl methacrylates.

6. The polymer of claim 5 wherein the reaction mixture includes at least one copolymerizable ethylenically unsaturated monomer selected from the group consisting of alkyl methacrylates having from 1 to about 20 carbon atoms in the alkyl group, alkyl acrylates having from 1 to about 20 carbon atoms in the alkyl group and styrene.

7. The polymer of claim 1 wherein the reaction mixture comprises from:
 about 65 to about 99.9 percent by weight of an alkyl methacrylate having from 1 to about 20 carbon atoms in the alkyl group;
 about 0.05 to about 25 percent by weight of an ethylenically unsaturated carboxylic acid; and
 about 0.05 to about 10 percent by weight of said primary amine group-containing copolymerizable vinyl monomer.

8. The polymer of claim 7 wherein the reaction mixture further comprises about 0.05 to about 10 percent by weight of either a hydroxyl-containing alkyl acrylate or a hydroxyl-containing alkyl methacrylate.

* * * * *